US008706099B2

(12) United States Patent
Cho et al.

(10) Patent No.: US 8,706,099 B2
(45) Date of Patent: Apr. 22, 2014

(54) METHOD AND APPARATUS FOR POWER SAVING OF FEMTO BASE STATION USING ANR FUNCTION IN WIRELESS COMMUNICATION SYSTEM

(75) Inventors: Eun Seon Cho, Daejeon (KR); Chan Yong Lee, Daejeon (KR); Hong Soog Kim, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 172 days.

(21) Appl. No.: 13/112,510

(22) Filed: May 20, 2011

(65) Prior Publication Data

US 2011/0287756 A1  Nov. 24, 2011

(30) Foreign Application Priority Data

May 20, 2010 (KR) ........................ 10-2010-0047526

(51) Int. Cl.
*H04M 3/00* (2006.01)
(52) U.S. Cl.
USPC ........ 455/418; 455/443; 455/444; 455/422.1; 455/436; 370/311
(58) Field of Classification Search
USPC .............. 455/574, 418, 443, 444, 422.1, 436; 370/311
See application file for complete search history.

(56) References Cited

U.S. PATENT DOCUMENTS

| 2009/0285143 | A1* | 11/2009 | Kwun et al. | 370/311 |
| 2010/0002614 | A1 | 1/2010 | Subrahmanya | |
| 2010/0227603 | A1* | 9/2010 | Gupta et al. | 455/418 |
| 2011/0244792 | A1* | 10/2011 | Park et al. | 455/39 |
| 2011/0244870 | A1* | 10/2011 | Lee | 455/444 |

FOREIGN PATENT DOCUMENTS

JP        2009-159355        7/2009

* cited by examiner

*Primary Examiner* — Patrick Edouard
*Assistant Examiner* — Chuck Huynh
(74) *Attorney, Agent, or Firm* — Nelson Mullins Riley & Scarborough LLP; Anthony A. Laurentano, Esq.

(57) ABSTRACT

Provided are a method and an apparatus for power saving of a femto base station operating as a CSG cell in a wireless communication system. A femto base station according to an exemplary embodiment of the present invention includes: a reception unit receiving signals from adjacent second femto base stations; a transmission unit transmitting signals to second femto base stations, and a control unit controlling to be transitioned to an active mode when a mode transition command is received from at least one second femto base station while operating in a sleep mode, in a wireless communication system constituted by a plurality of femto base stations using automatic neighbor relation (ANR).

16 Claims, 4 Drawing Sheets

| | PHYSICAL LAYER IDENTIFIER | BASE STATION IDENTIFIER | OAM ALLOCATION ATTRIBUTE | CELL TYPE | MODE STATE | MEMBER TERMINAL LIST |
|---|---|---|---|---|---|---|
| 1 | PCI1 | TCI1 | - | OPEN | OFF | UE1, UE12, UE13 |
| 2 | PCI3 | TCI3 | - | CSG | ON | UE3, UE8 |
| 3 | PCI4 | TCI4 | - | CSG | ON | UE4 |
| 4 | PCI5 | TCI5 | - | CSG | ON | UE5, UE9 |
| 5 | PCI6 | TCI6 | - | CSG | ON | UE6, UE10 |
| 6 | PCI7 | TCI7 | - | CSG | ON | UE7 |

US 8,706,099 B2

METHOD AND APPARATUS FOR POWER SAVING OF FEMTO BASE STATION USING ANR FUNCTION IN WIRELESS COMMUNICATION SYSTEM

CROSS-REFERENCE TO RELATED APPLICATIONS

This application claims priority under 35 U.S.C. §119 to Korean Patent Application No. 10-2010-0047526, filed on May 20, 2010, in the Korean Intellectual Property Office, the disclosure of which is incorporated herein by reference in its entirety.

TECHNICAL FIELD

The present invention relates to a method and an apparatus for power saving of a femto base station and reducing an amount of interference generated by operating the femto base station in a wireless communication system.

BACKGROUND

In a cellular type wireless communication system, a channel condition is deteriorated due to a geographical condition or a distance between a terminal and a base station or the movement of the terminal, such that communication between the terminal and the base station is not smoothly performed. For example, even in a service area of the base station a radio wave shadow area is formed by an enclosed building such as an office or a house. As a result, the wireless communication system provides a femto cell service for providing a high-speed data service while solving a problem in providing a service in the radio wave shadow area.

Herein, a femto cell is a micro mobile communication base station accessing a mobile communication core network through a broadband network installed in the inside of a home or the office. The name of the femto cell is a compound word of 'femto' meaning $10^{-15}$ and 'cell' representing a communicatable range for movement transition. The femto cell represents a base station capable of providing coverage of a cell radius of 10 m or less.

Since the femto base station uses a commercial broadband network such as a digital subscriber loop (DSL) or a cable modem installed inside as a back hole, the femto base station may be installed by users themselves. At this time, since the femto base station is installed by the users themselves, electric power required by the femto base station should be directly supplied to the home or the office. Further, since a plurality of femto base stations may be positioned in a service area of a macro base station, operating the femto base station may have a negative influence such as interference to terminals of another femto cell or terminals of a macro cell.

Accordingly, the wireless communication system providing the femto cell needs a method for power saving of the femto base station and reducing an amount of interference generated by operating the femto base station.

SUMMARY

An exemplary embodiment of the present invention provides a femto base station that includes: a reception unit receiving signals from adjacent second femto base stations; a transmission unit transmitting signals to second femto base stations, and a control unit controlling at least one second femto base station to be transitioned to an active mode from the at least one second femto base station when a mode transition command is received from the at least second femto base station while operating in a sleep mode, in a wireless communication system constituted by a plurality of femto base stations using automatic neighbor relation (ANR).

Another exemplary embodiment of the present invention provides a method of controlling a femto base station that includes: determining whether or not the terminal exists in its own service coverage in a first femto base station; and transmitting mode transition information to adjacent second femto base stations and transitioning an active mode to a sleep mode when all the terminals do not exist in the service coverage on the basis of the determination result.

Other features and aspects will be apparent from the following detailed description, the drawings, and the claims.

DETAILED DESCRIPTION OF EMBODIMENTS

Figure 1:
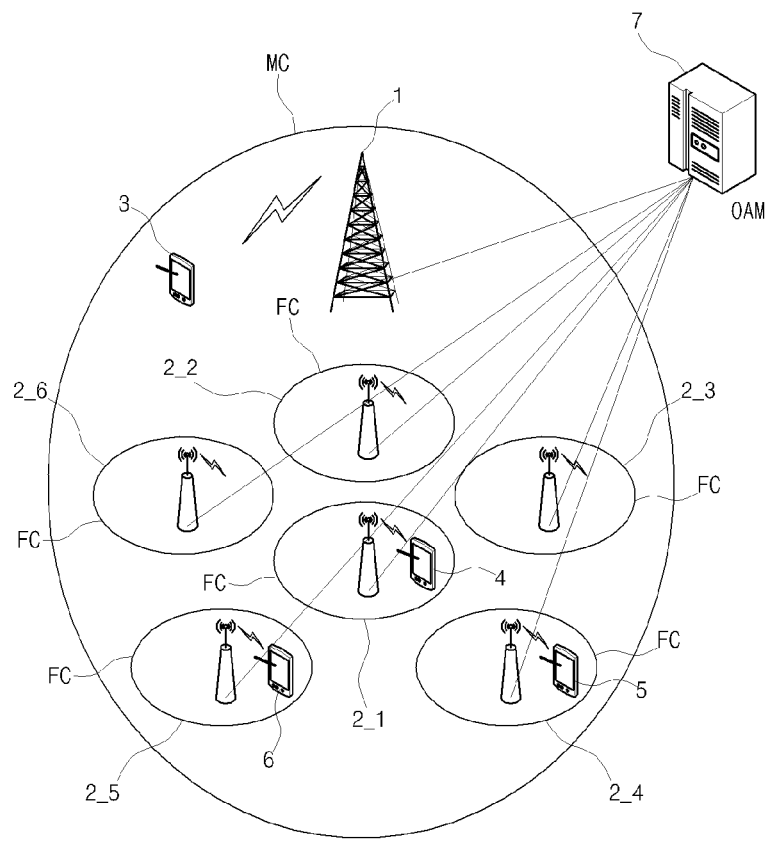
FIG. 1 is a configuration diagram of a wireless communication system including a femto base station according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Referring to FIG. 1, a wireless communication system including a femto base station according to an exemplary embodiment of the present invention will be described. FIG. 1 is a configuration diagram of a wireless communication system including a femto base station according to an exemplary embodiment of the present invention.

Referring to FIG. 1 a macro base station 1 manages one macro cell MC. Further, at least one femto cell FC managed by at least one femto base station 2_1, 2_2, 2_3, 2_4, 2_5, 2_6 may be positioned in the macro cell MC.

A first terminal 3 is positioned in the macro cell MC, but is not positioned in the femto cell FC. Therefore, the first terminal 3 accesses the macro base station 1 to perform communication. If the first terminal 3 moves into the femto cell FC, the first terminal 3 accesses the femto base station 2_1, 2_2, 2_3, 2_4, 2_5, 2_6 to perform communication.

Since a second terminal 4 is positioned in the femto cell FC, the second terminal 4 accesses to the femto base station 2_1 to perform communication. If the second terminal 4 moves out of the femto cell FC, the second terminal 4 accesses the macro base station 1 to perform communication.

Herein, the femto base station 2_1, 2_2, 2_3, 2_4, 2_5, 2_6 may operate in any one type of an open access femto base station, a close subscriber group (CSG) femto base station, and a hybrid access femto base station depending on limitation of an accessible terminal 3, 4, 5, 6 or not. The open access femto base station represents a base station which is usable by all terminals which subscribe in the corresponding mobile communication service. The closed subscriber group (CSG) femto base station represents a base station which is usable by only terminals designed by the consent of an installer of the femto base station and a mobile communication service provider. The hybrid access femto base station represents a base station supporting both the open access type and the CSG type. That is, the hybrid access femto base station operates as the CSG femto base station with respect to terminals which are accepted to access the femto base station and operates as the open access femto base station with respect to the rest of terminals. At this time, the hybrid femto base station controls the terminals which are accepted to access the femto base station more preferential than the rest terminals.

Further, the hybrid femto base station may limit an amount wireless resources which are allocatable to terminals which are not accepted to access in order to ensure services of the terminals which are accepted to access the femto base station.

If the femto base station 2_1, 2_2, 2_3, 2_4, 2_5, 2_6 operates the open access or hybrid access femto base station, when the first terminal 3 and the second terminal 4 are positioned in the femto cell FC, the first and second terminals 3 and 4 access the femto base station 2_1, 2_2, 2_3, 2_4, 2_5, 2_6 to perform communication.

If the femto base station 2_1, 2_2, 2_3, 2_4, 2_5, 2_6 operates the closed subscriber group (CSG) femto base station, even though the first terminal 3 and the second terminal 4 are positioned in the femto cell FC, the first terminal 3 and the second terminal 4 are not allowed to access the femto base station 2_1, 2_2, 2_3, 2_4, 2_5, 2_6. Therefore, the first terminal 3 and the second terminal 4 cannot access the femto base station 2_1, 2_2, 2_3, 2_4, 2_5, 2_6.

That is, when the first terminal 3 and the second terminal 4 are not allowed to access femto base station 2_1, 2_2, 2_3, 2_4, 2_5, 2_6, the first terminal 3 and the second terminal 4 access the macro base station 1 even in the femto cell FC to perform communication.

In order a plurality of femto base stations included in one macro cell to efficiently perform wireless communication, base station self-configuration for interworking with the existing system should be performed. This includes interface set-up, a task automatically granting a physical ID for a generated cell, and an information exchanging task for establishing a relationship with neighboring cells. In particular, the network interface set-up includes an interface connecting with an operation management (OAM) station 7 at the center of the system. This interface sends and receives OAM information for supporting movement of the terminal 3, 4, 5, 6 by exchanging a signal with the OAM station 7.

Figure 2:
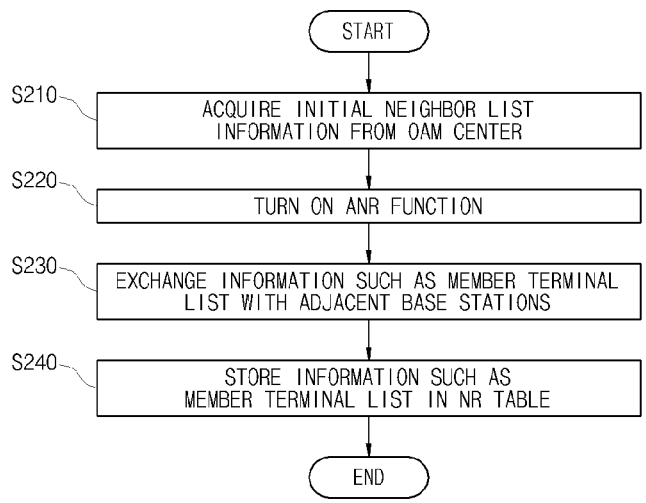
FIG. 2 is a flowchart describing an information exchanging procedure using an ANR function of a femto base station according to an exemplary embodiment of the present invention.
Figures 3, 4:
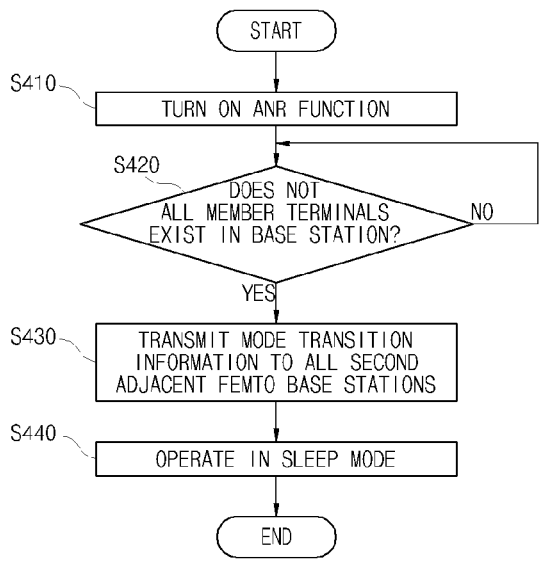
FIG. 3 is a configuration diagram showing an exemplary embodiment of a neighbor relation (NR) table structure managed by a femto base station proposed in the present invention.
FIG. 4 is a flowchart showing a step for transitioning a femto base station to a sleep mode by using a method of controlling the femto base station according to another exemplary embodiment of the present invention.

Next, automatic neighbor relation (ANR) set-up which is the information exchanging task for establishing the relationship with the neighbor cells is required. Hereinafter, referring to FIGS. 1, 2, and 3 will be described in detail. FIG. 2 is a flowchart describing an information exchanging procedure using an ANR function of a femto base station according to an exemplary embodiment. FIG. 3 is a configuration diagram showing an exemplary embodiment of a neighbor relation (NR) table structure managed by a femto base station proposed in the present invention.

Referring to FIGS. 1, 2, and 3, when power is supplied to the femto base station 2_1, 2_2, 2_3, 2_4, 2_5, 2_6, the femto base station 2 establishes connection with the OAM station 7 while performing a base station self-configuration procedure. Herein, the base station self-configuration procedure includes a base station initialization process for completing up to an RF transmission state, a process of setting basic information required to operate a system by using an automatic installation program, set-up of a network interface, a task for automatically granting a physical ID for a generated cell, and an information exchanging task for establishing a relationship with neighbor cells. For this, the femto base station 2_1, 2_2, 2_3, 2_4, 2_5, 2_6 receives neighbor list information including a base station identifier, and the like required for an initial operation of the ANR function from the OAM station 7 in order for the information exchanging task for establishing the relationship with the neighbor cells (S210).

The femto base station 2_1, 2_2, 2_3, 2_4, 2_5, 2_6 sets up X2 interface with an adjacent base station by using the neighbor list information and when it is impossible to set up the X2 interface, the femto base station 2_1, 2_2, 2_3, 2_4, 2_5, 2_6 exchange information through S1 interface which is previously set up. The X2 interface is set up in order the femto base station 2_1, 2_2, 2_3, 2_4, 2_5, 2_6 to exchange a signal for fast handover between different base stations, information on a load indicator, and information for self-optimization of the operation of the base station. As such, the femto base station 2_1, 2_2, 2_3, 2_4, 2_5, 2_6 sets up an interface with the OAM station 7 at the center of the system or between different base stations to use the ANR function (S220).

When the femto base station 2_1, 2_2, 2_3, 2_4, 2_5, 2_6 can use the ANR function by establishing connection with adjacent neighbor base stations, the femto base station 2_1, 2_2, 2_3, 2_4, 2_5, 2_6 exchanges information including a list of member terminals which are allowed to access the adjacent base stations with the adjacent base stations (S230) and stores information received from the adjacent base stations in a neighbor relation (NR) table (S240).

For example, as shown in FIG. 3, a physical cell identity (PCI) which is a physical layer identifier for identifying a femto cell of an adjacent femto base station, a target cell identity (TCI) which is a global cell identifier representing an identifier of each femto base station, an OMC control allocation attributes, a femto cell type, a current operation mode state of the femto base station, and a list of member terminals which are allowed to access for each femto cell may be included in the NR table.

ANR set-up which is the information exchanging task for establishing a relationship with neighbor cells represents a base station update process depending on the generation of a new cell and the extinction of the existing cell and may be implemented through the terminal 3, 4, 5, and 6.

Specifically, the terminal 4 transfers a global cell identifier of a new neighbor femto cell FC to its own femto base station 2_1 and the femto base station 2_1 may set up the X2 interface while updating a list of neighbors.

Figure 5:
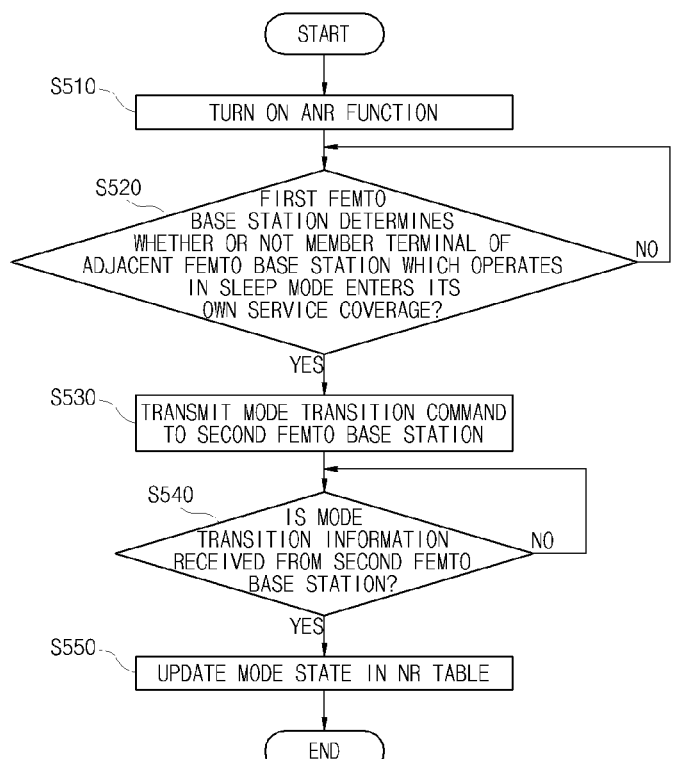
FIG. 5 is a flowchart showing a step for transitioning a femto base station to an active mode by using a method of controlling the femto base station according to another exemplary embodiment of the present invention.
Figure 6:
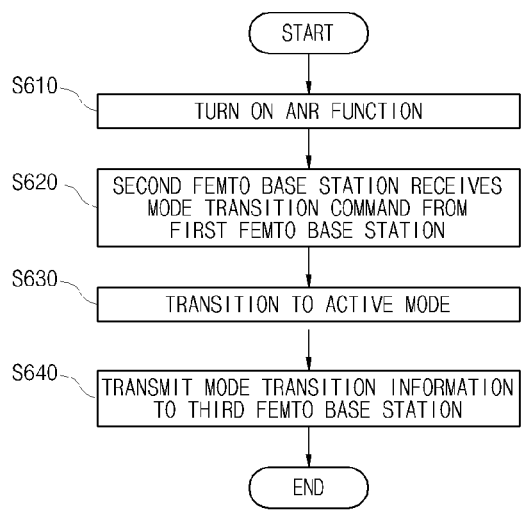
FIG. 6 is a flowchart showing a step for transitioning a femto base station to an active mode by using a method of controlling the femto base station according to another exemplary embodiment of the present invention.

Referring to FIGS. 1, 4, 5, and 6, a method of controlling a femto base station according to another exemplary embodiment of the present invention will be described. FIG. 4 is a flowchart showing a step for transitioning a femto base station to a sleep mode by using a method of controlling the femto base station according to another exemplary embodiment of the present invention, FIG. 5 is a flowchart showing a step for transitioning a femto base station to an active mode by using a method of controlling the femto base station according to another exemplary embodiment of the present invention, and FIG. 6 is a flowchart showing a step for transitioning a femto base station to an active mode by using a method of controlling the femto base station according to another exemplary embodiment of the present invention.

Prior to describing the method of controlling the femto base station according to another exemplary embodiment of the present invention, it is assumed that in a wireless communication system constituted by a plurality of femto base stations using an automatic neighbor relation (ANR) function, the plurality of femto base stations operate closed subscriber group (CSG) cells to allow only a terminal which is allowed to access the femto base stations. The method of controlling the femto base station according to the exemplary embodiment is not limited to the assumed operation environment.

Referring to FIGS. 1 and 4, while the ANR function operates (S410), a first femto base station 2_1 verifies whether or not a member terminal 4 which is allowed to access the first femto base station 2_1 itself exists in its own service coverage (S420).

The first femto base station 2_1 may verify whether or not the member terminal 4 exists in its own service coverage by using positional information of the member terminal 4. As one example, the first femto base station 2_1 may receive the positional information from the member terminal 4 and as another example, the first femto base station 2_1 may measure the positional information of the member terminal 4.

The first femto base station 2_1 may determine whether or not the member terminal 4 exists in its own service coverage by comparing its own service coverage which is inputted with the acquired positional information of the member terminal 4.

Further, the first femto base station 2_1 determines whether or not the member terminal 4 accessing the first femto base station 2_1 within a predetermined reference time to determine whether or not the member terminal 4 exists in its own service coverage.

Further, the first femto base station 2_1 may store list information including an identifier of the member terminal 4 and may determine whether or not the member terminal 4 exists in its own service coverage by comparing the stored identifier with an access verification message including the transmitted identifier when the member terminal 4 enters the service coverage of the first femto base station 2_1.

On the verification result, when all the member terminals 4 do not exist in its own service coverage, the first femto base station 2_1 transmits mode transition information to adjacent femto base stations 2_2, 2_3, 2_4, 2_5, and 2_6 (S430). That is, the first femto base station 2_1 notifies that the first femto base station 2_1 transitions its mode to the second femto base stations 2_2, 2_3, 2_4, 2_5, and 2_6.

Next, the first femto base station 2_1 which operates in the active mode is transitioned to the sleep mode (S440).

Referring to FIGS. 1 and 5, while the ANR function operates (S510), the first femto base station 2_1 verifies whether or not member terminals 5 and 6 which are allowed to access the second femto base stations 2_4 and 2_5 which operate in the sleep mode exists in its own service coverage (S520). For example, the first femto base station 2_1 may verify whether or not the member terminals 5 and 6 exist in its own service coverage by using positional information of the member terminals 5 and 6 which are allowed to access the second femto base stations 2_2, 2_3, 2_4, 2_5, and 2_6. A detailed method for verifying existence or not has been described above. Therefore, the detailed method will be omitted.

On the basis of the verification result, when even any one of the member terminals 5 and 6 of the second femto base stations 2_4 and 2_5 exists the service coverage of the first femto base station 2_1, the first femto base station 2_1 transmits a mode transition command configured in any one format of a message, a signature, and the like to the second femto base stations 2_4 and 2_5 (S530).

For example, when the member terminal 5 which is allowed to access the second femto base station 2_4 exists in the service coverage of the first femto base station 2_1, the first femto base station 2_1 transmits the mode transition command to only the second femto base station 2_4.

Next, the first femto base station 2_1 determines whether or not the mode transition information is received from the second femto base station 2_4 which transmits the mode transition command (S540). On the basis of the determination result, when the mode transition information is received, the first femto base station 2_1 updates a mode state of the second femto base station 2_4 in the NR table (S550).

Referring to FIGS. 1 and 6, while the ANR function operates (S610), when the second femto base station 2_4 receives the mode transition command configured in any one format of the message, the signature, and the like from the first femto base station 2_1 through step S530 (S620), the second femto base station 2_4 which receives the mode transition command transitions to the active mode (S630). Thereafter, the second femto base station 2_4 transmits the mode transition information to the adjacent femto base stations 2_1, 2_2, 2_3, 2_5, and 2_6 (S640).

Figure 7:
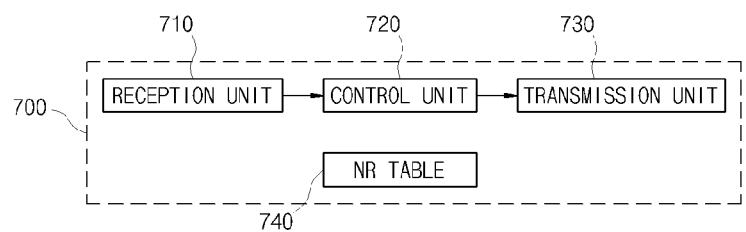
FIG. 7 is a block diagram illustrating a configuration of a femto base station according to an exemplary embodiment of the present invention.

Referring to FIG. 7, the femto base station according to the exemplary embodiment of the present invention will be described. FIG. 7 is a block diagram illustrating a configuration of a femto base station according to an exemplary embodiment of the present invention.

Referring to FIG. 7, the femto base station 700 operates in a wireless communication system environment using the automatic neighbor relation (ANR) function, is connected with the adjacent femto base stations by using at least one interface of the X2 interface and the S1 interface, and includes a reception unit 710, a transmission unit 720, and a control unit 730.

The reception unit 710 receives information configured in any one format of the message, the signature, and the like from at least one of the adjacent femto base stations and transmits the received information to the control unit 730.

When the femto base station 700 operates in the sleep mode, the control unit 720 controls the femto base station 700 to be transitioned to the active mode in accordance with the mode transition command transmitted through the reception unit 710. Further, after the control unit 720 transitions the femto base station 700 to the active mode, the control unit 720 determines whether or not member terminals which are allowed to access the femto base station 700 exist in its own service coverage. For example, the control unit 720 may determine whether or not the member terminals exist in its own service coverage by using the positional information of the accessed member terminals. On the basis of the determination result, when all the accessed member terminals do not exist in its own service coverage, the control unit 720 controls the femto base station 700 to be transitioned to the sleep mode.

Further, after the femto base station 700 is transitioned to the sleep mode/the active mode, the control unit 720 controls to transmit the mode transition information to the adjacent second femto base station through the transmission unit 730.

The femto base station 700 may further include a neighbor relation (NR) table 740 storing information received from the adjacent second femto base stations.

Herein, a physical cell identity (PCI) which is a physical layer identifier for identifying a femto cell of an adjacent femto base station, a target cell identity (TCI) which is a global cell identifier representing an identifier of each femto base station, OMC control allocation attributes, a femto cell type, a current operation mode state of the femto base station, and a list of member terminals which are allowed to access for each femto cell may be included in the NR table.

According to the exemplary embodiments of the present invention, a wireless communication system, when a terminal which is accessible does not exist in a femto base station operating as a closed subscriber group (CSG) cell, the femto base station is switched to a sleep mode and when a terminal which is accepted enters an adjacent base station by using an ANR function through X2 interface or S1 interface with a macro base station to which the femto base station belongs, the femto base station which operates in the sleep mode is switched to an active mode, thereby saving power of the femto base station and reducing an amount of interference generated by operating the femto base station.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A femto base station using an automatic neighbor relation (ANR) function, comprising:
   a reception unit receiving a neighbor list table including identifiers of at least one adjacent femto base stations required for the operation of ANR, from an operation and maintenance center (OMC) while performing a base station self-configuring procedure;
   a verification unit for determining accessibility of a mobile terminal within a coverage area of the femto base station, based on an identifier of the mobile terminal and a predetermined reference time of access;
   a connection unit for connection with the at least one adjacent femto base stations using said neighbor list;
   a transmitting unit for notifying said at least one adjacent femto base stations a mode transition information state;
   a control unit configured for controlling the femto base station operating in a sleep mode to be transitioned to an active mode when the femto base station receives a mode transition command from at least one of the adjacent femto base stations when said mobile terminal enters a coverage area of the at least one adjacent femto base stations; and
   updating the mode transition information state in the neighbor list table.

2. The femto base station of claim 1, wherein the reception unit receives information configured in any one format of a message, a signature, and the like from at least one of the adjacent femto base stations.

3. The femto base station of claim 1, wherein the femto base station establishes connected with the adjacent femto base stations by using at least one of interface of X2 interface and S1 interface.

4. The femto base station of claim 3, wherein when power is supplied, the femto base station receives a neighbor list including identifiers of the adjacent femto base stations required for the operation of ANR from an operation and maintenance center (OMC) while performing a base station self-configuration procedure, and
   the femto base station establishes connected with the adjacent femto base stations by using at least one interface of the X2 interface and the S1 interface by using the neighbor list.

5. The femto base station of claim 1, further comprising a transmission unit transmitting mode transition information to the adjacent femto base stations in accordance with a control of the control unit when the femto base station is transitioned to the active mode.

6. The femto base station of claim 1, wherein the femto base station operates as a closed subscriber group (CSG) cell and is accessible by only a terminal (member terminal) which is allowed to access, and
   the control unit controls the femto base station to be transitioned to the sleep mode when all the member terminals do not exist in its own service coverage after the femto base station is transitioned to the active mode.

7. The femto base station of claim 6, further comprising a transmission unit transmitting mode transition information to the adjacent femto base stations in accordance with the control of the control unit when the femto base station is transitioned to the sleep mode.

8. The femto base station of claim 1, further comprising a neighbor relation (NR) table storing the information received from the adjacent femto base stations.

9. The femto base station of claim 8, wherein the NR table stores at least one of a physical cell identity (PCI) which is a physical layer identifier for identifying a femto cell of the adjacent femto base station, a target cell identity (TCI) which is a global cell identifier representing an identifier of each femto base station, OMC control allocation attributes, a femto cell type, a current operation mode state of the femto base station, and a list of member terminals which are allowed to access for each femto cell.

10. A method of controlling a femto base station operating as a closed subscriber group cell and to which only one or more authorized terminals have access, comprising:
   determining whether or not the terminals exist in a service coverage in a first femto base station;
   transmitting mode transition information to adjacent second femto base stations and transition from an active mode to a sleep mode when all the terminals do not exist in the service coverage based on the determination result;
   receiving a neighbor list including an identifier of a second femto base station required for the operation of automatic neighbor relation (ANR) from an operation and maintenance center (OMC) while the first femto base station performs a base station self-configuration procedure;
   establishing connection with the second femto base station through the use of the neighbor list by using at least one of an X2 interface and an S1 interface;

allowing the first femto base station to receive information from the connected second femto base station; and storing the received information in a neighbor relation (NR) table.

11. The method of claim 10, wherein the information stored in the NR table includes at least one of a physical cell identity (PCI) which is a physical layer identifier for identifying a femto cell of the second femto base station, a target cell identity (TCI) which is a global cell identifier representing an identifier of the second femto base station, OMC control allocation attributes, a femto cell type, a current operation mode state of the second femto base station, and a list of member terminals which are allowed to access the second femto base stations.

12. The method of claim 10, wherein the determining includes determining whether or not the terminal accessing the first femto base station within a predetermined reference time exists.

13. The method of claim 10, wherein the determining includes determining whether or not the terminals exist in the service coverage by comparing the inputted service coverage of the first femto base station with the positional informant of the terminals acquired from the terminals.

14. The method of claim 10, wherein the determining includes:

receiving an access verification message from the terminal which enters the service coverage; and comparing an identifier of the terminal stored in the first femto base station with an identifier of the terminal stored in the first femto base station.

15. A method of controlling a femto base station, comprising:

allowing a first femto base station to transmit a mode transition command to a second femto base station which is operating in a sleep mode when a terminal, which is access allowed in a coverage area of the second femto base station, enters a coverage area of the first base station;

when the second femto base station receives the mode transition command from the first femto base station, transitioning the second femto base station to an active mode;

allowing the second femto base station to transmit mode transition information to an adjacent femto base station;

establishing a connection between the second femto base station and the adjacent femto base station by using an X2 interface or an S1 interface, wherein when power is supplied, the second femto base station receives a neighbor list including identifiers of the adjacent femto base stations required for the operation of an automatic neighbor relation (ANR) from an operation and maintenance center (OMC) while performing a base station self-configuration procedure, and wherein the second femto base station establishes the connection with adjacent femto base station by using the neighbor list.

16. The method of claim 15, wherein the transmitting of the mode transition command includes:

allowing the first femto base station to determine whether or not terminals which are allowed to access the second femto base station exist in its own service coverage; and transmitting the mode transition command configured in any one format of a message, a signature, and the like to the second femto base station when even any one of the terminals which are allowed to access the second femto base station exists in its own service coverage on the basis of the determination result.

* * * * *